Feb. 1, 1927.  1,616,338
M. STEINKRITZER
NUT LOCK
Filed Aug. 5, 1926
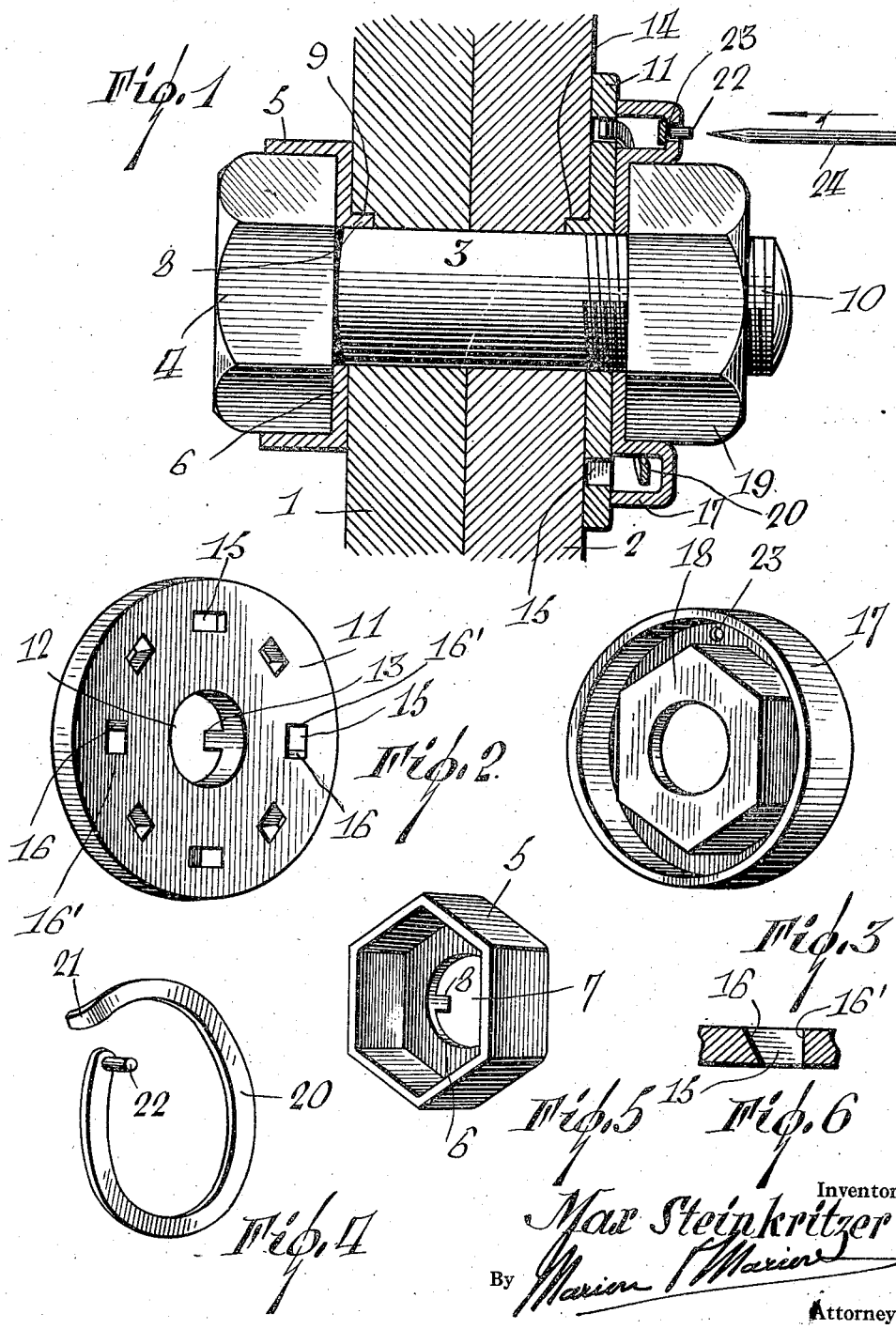
Inventor
Max Steinkritzer Patented Feb. 1, 1927.

1,616,338

UNITED STATES PATENT OFFICE.

MAX STEINKRITZER, OF DONNACONA, QUEBEC, CANADA.

NUT LOCK.

Application filed August 5, 1926. Serial No. 127,213.

The present invention pertains to a novel nut lock designed for the general purpose of preventing a nut from becoming unthreaded from a bolt.

This object is obtained essentially by fitting the nut snugly into a cap and locking the cap to one of the members secured by the bolt. More specifically, the threaded end of the bolt is surrounded by an apertured disc which is suitably locked to one of the clamped members. The disc is then engaged by a cap also surrounding the threaded end and having a depression shaped like the nut and receiving the same. A detent member is disposed between the disc and cap and is locked to both these parts. The nut which is threaded on this end of the bolt is received in the depression of the cap and clamps all the parts firmly together.

The nut obviously cannot turn relatively to the cap, and since the latter is locked to the disc and in turn to one of the secured members, the nut cannot work off the threaded end. Special means are provided for breaking the connection between the disc and cap when it is desired to remove the nut.

The invention is fully disclosed in the following description and in the accompanying drawings in which;

Figure 1 is a sectional view of the device;

Figure 2 is a perspective view of the locking disc;

Figure 3 is a perspective view of the cap in which the nut is received;

Figure 4 is a perspective view of the spring detent;

Figure 5 is a perspective view of the box which receives the head of the bolt; and Figure 6 is a detail section of the locking disc.

Reference to these views will now be made by use of like characters which are employed to designate corresponding parts throughout.

As shown in Figure 1 the members 1 and 2 which are to be clamped together are penetrated by the bolt 3 in the usual manner. The head 4 of the bolt is, however, received in a box 5 having the lateral configuration of the bolt head so that the latter will fit snugly therein. The base 6 of the box has an aperture 7 through which the bolt passes and is also provided with a lug 8 extending from the edge of the aperture into an appropriate notch 9 cut in the member 1.

The threaded end 10 of the bolt is exposed through the remaining member 2 and is surrounded first by an annular disc 11 which engages the member 2. At the edge of the central aperture 12 of the disc, a lug 13 extends into an appropriate notch 14 cut in the face of the member 2. The disc is formed further with a circular series of apertures 15 each having an inwardly inclined wall 16 and a straight wall 16' as shown in detail in Figure 6.

A circular cap 17 is adapted to engage the disc 11 and is formed with a depression 18 having the configuration of the nut 19 and adapted to receive the same. Prior to the application of the cap, a spring detent 20 is inserted in the cap in such a manner as to surround the depression 18. One end of the detent is offset as at 21 in order to enter another one of the apertures 15. The remaining end carries a pin 22 adapted to enter an aperture 23 formed in the cap.

Finally, the nut 19 is inserted in the depression 18 and turned on the threaded end 10 until the member 2, disc 11 and cap are clamped firmly together.

The relation between the walls 16 and 16' of the apertures 15 and the threads on the end 10 is such that when the nut 19 is tightened the offset end 21 moves from the wall 16' to the inclined wall 16 of each aperture. The offset end readily slides over the inclined walls 16 so that the nut and associated parts may be tightened to the full extent. If an attempt is made to release the nut, the cap 17 obviously moves with it and the end 21 abuts one of the straight walls 16'. Since the end 21 is unable to pass this wall, the detent does not move and therefore holds the cap 17 and nut 19 against turning.

When it is desired to release the nut, a pin 24 is driven against the pin 22 in order to move the latter out of the aperture 23 and in engagement with the base of the cap at one side of the aperture. The nut and cap may now be turned one revolution until the aperture 23 again arrives at the stationary pin 22 and receives the same. The operation of ejecting the pin 22 must be repeated for each turn in releasing the nut until the offset end 21 may be reached by a thin tool and removed from the apertures 15.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:

1. A nut lock comprising an apertured disc adapted to surround the threaded end of a bolt, a cap adapted to surround said end, a depression in said cap and having the shape of a nut, and a detent member coiled in said cap around the bolt, and adapted for locking in the apertures of said disc and in said cap.

2. A nut lock comprising an apertured disc adapted to surround the threaded end of a bolt, a cap adapted to surround said end, a depression in said cap and having the shape of a nut, and a detent member coiled in said cap around the bolt, and having one end receivable in said apertures, and means for locking the remaining end to said cap.

3. A nut lock comprising an apertured disc adapted to surround the threaded end of a bolt, a cap adapted to surround said end, a depression in said cap and having the shape of a nut, each of said apertures having an inclined wall and a straight wall, and a detent member coiled in said cap, around the bolt and adapted for locking in the apertures of said disc and in said cap.

4. A nut lock comprising an apertured disc adapted to surround the threaded end of a bolt, a cap adapted to surround said end, a depression in said cap and having the shape of a nut, each of said apertures having an inclined wall and a straight wall, and a detent member coiled in said cap, around the bolt and having one end receivable in said apertures, and means for locking the remaining end to said cap.

5. A nut lock comprising an apertured disc adapted to surround the threaded end of a bolt, a cap adapted to surround said end, a depression in said cap and having the shape of a nut, a detent member coiled in said cap, around the bolt and having one end receivable in said apertures, and a pin provided at the remaining end of said detent member, said cap having an aperture adapted to receive said pin.

In witness whereof I have hereunto set my hand.

MAX STEINKRITZER.